United States Patent
Stefan

[15] 3,688,745
[45] Sept. 5, 1972

[54] ENSILAGE FEEDER

[72] Inventor: Celestinus J. Stefan, Arcade, N.Y. 14009

[22] Filed: March 10, 1971

[21] Appl. No.: 122,921

[52] U.S. Cl.............119/52 AF, 119/56 R, 198/223
[51] Int. Cl............................................A01k 05/00
[58] Field of Search....119/52 AF, 52 B, 56 R, 51.11; 198/223, 224

[56] References Cited

UNITED STATES PATENTS

| | | | |
|---|---|---|---|
| 2,522,449 | 9/1950 | Inman | 119/52 AF |
| 3,103,203 | 9/1963 | Haen | 119/52 AF X |
| 3,251,454 | 5/1966 | Buschbom | 119/52 AF X |
| 3,508,524 | 4/1970 | Harms | 119/52 AF |

Primary Examiner—Hugh R. Chamblee
Attorney—Bean & Bean

[57] ABSTRACT

A system for feeding and distributing ensilage or other relatively cohesive livestock food material in a substantially uniform manner along a livestock feeding area, wherein a conveyor including a plurality of pusher elements mounted for reciprocating movement is employed to form and push charges of ensilage along a horizontally elongated supporting surface arranged intermediate a pair of vertically disposed side walls; the supporting surface cooperating with the side walls to define a pair of downwardly opening ensilage discharge openings extending horizontally substantially throughout the feeding area.

10 Claims, 7 Drawing Figures

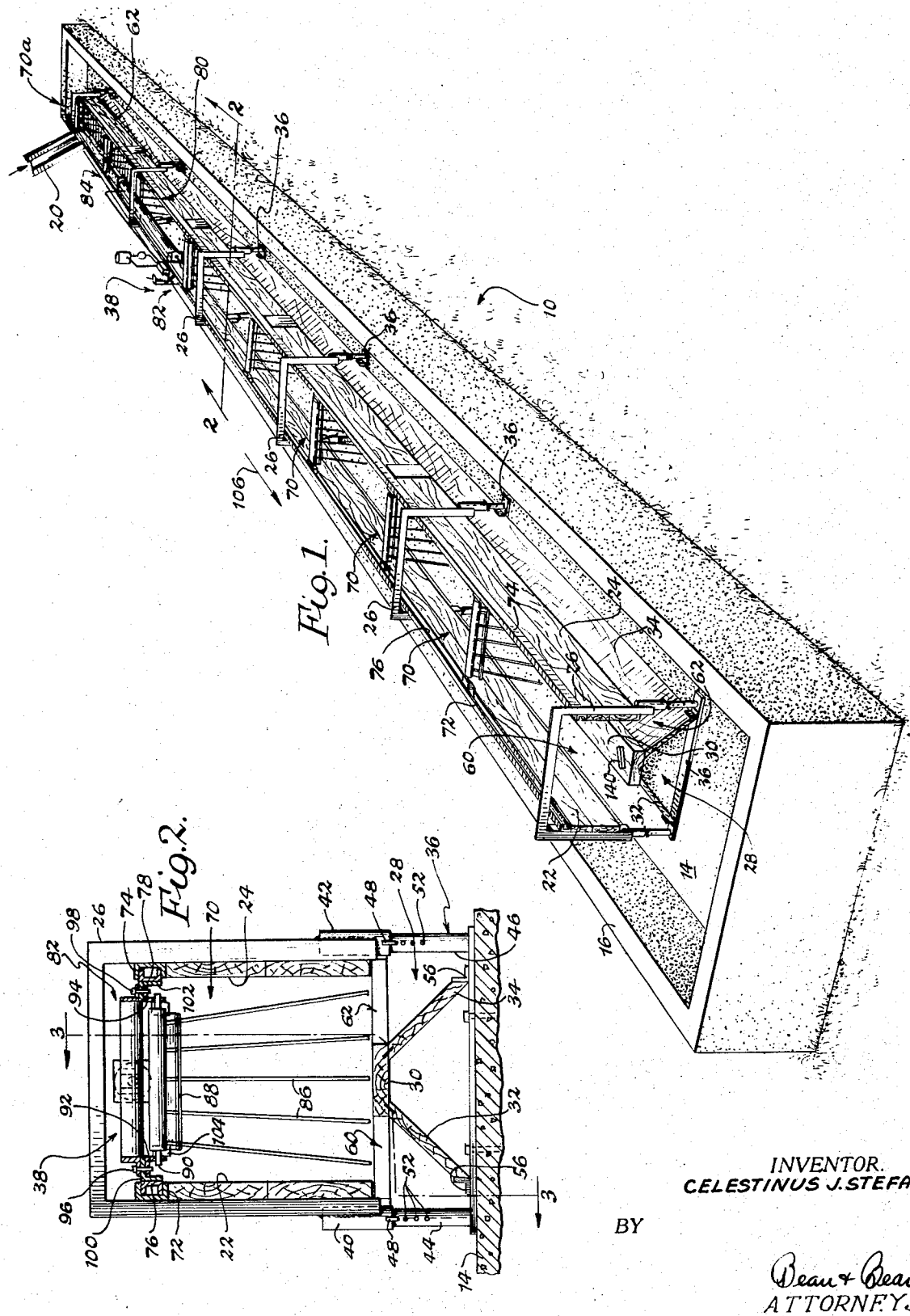

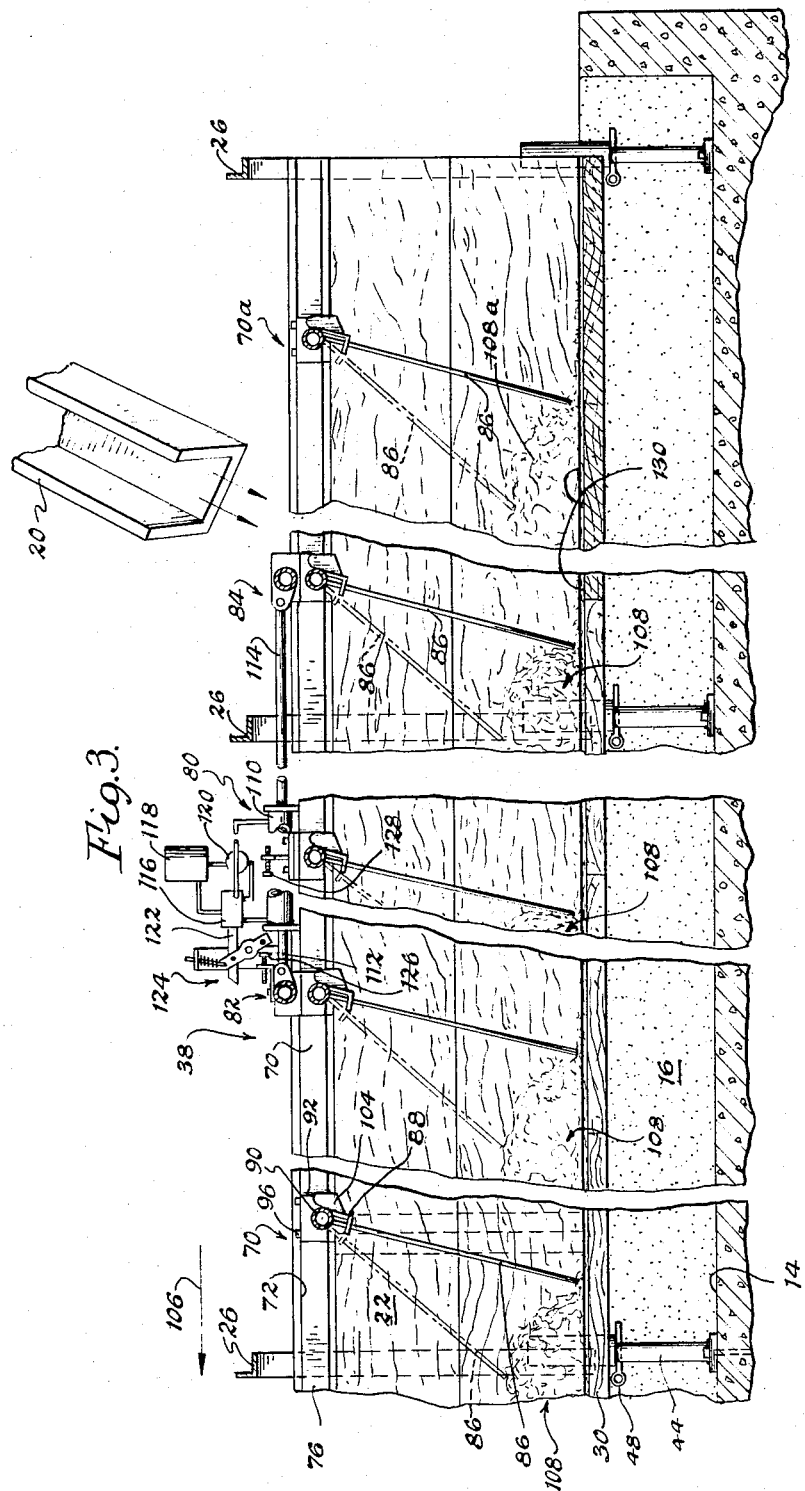

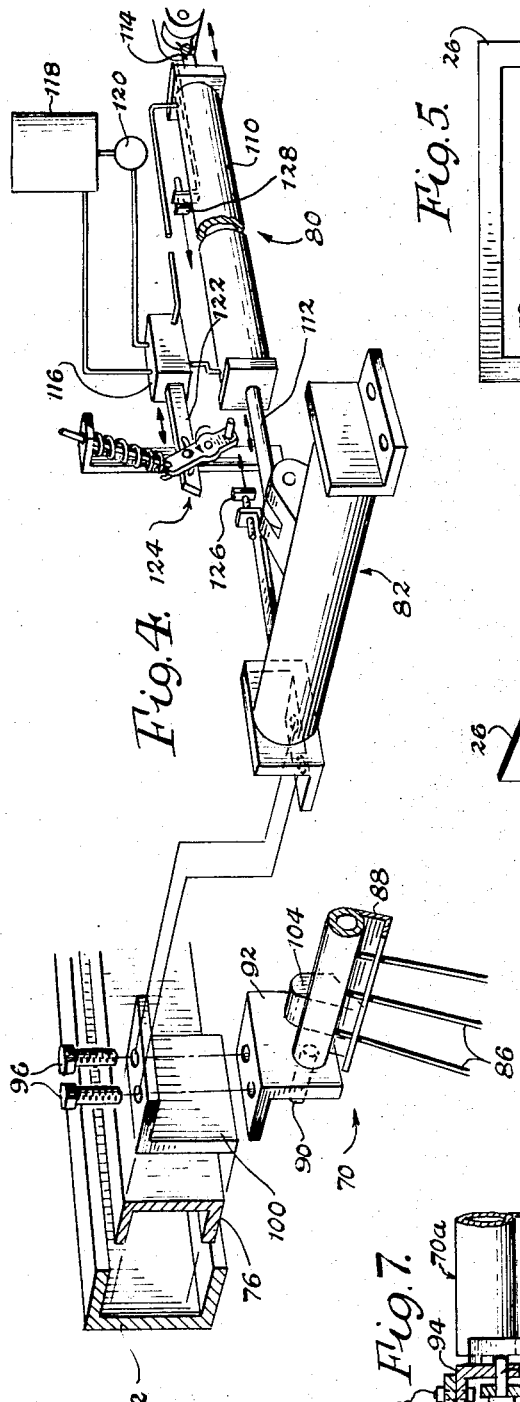
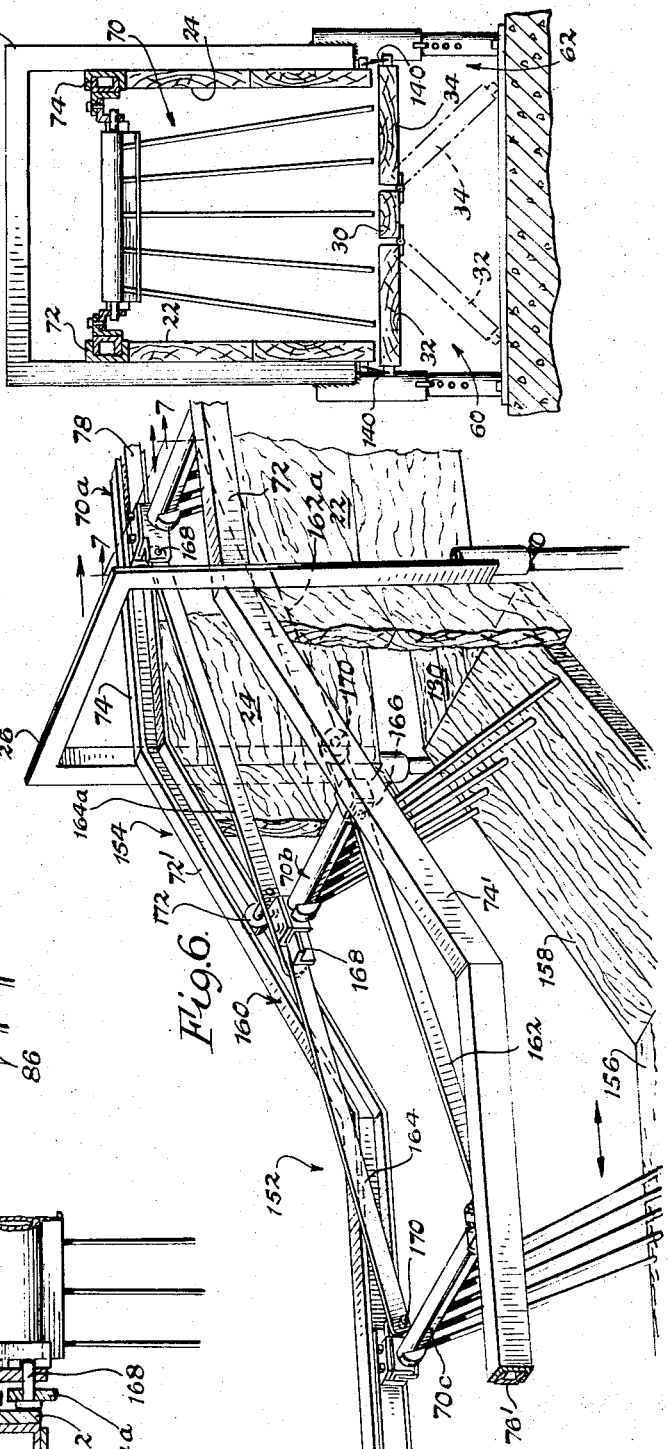

3,688,745

ENSILAGE FEEDER

SUMMARY OF THE INVENTION

The present invention is directed towards a system for feeding and distributing ensilage or other relatively cohesive livestock food material in a substantially uniform manner throughout a livestock feeding area.

The present system is primarily directed to an improved system for distributing ensilage throughout a livestock feeding area, such as a trough having opposite sides accessible to livestock to be fed. The system broadly includes a pair of parallel, vertically disposed side walls, which are arranged to extend lengthwise of the trough; an elongated upwardly facing ensilage supporting surface defining member, which is arranged intermediate the side walls and cooperates therewith to define a pair of downwardly opening ensilage discharge slots extending lengthwise of and on opposite sides of the trough; and a conveyor for feeding ensilage supplied to an upstream end of the system from a silo or the like along the supporting surface for discharge through the slot openings.

In the preferred form of the present system, the side walls and the supporting surface defining member are positionally supported relative to each other and to the trough by a plurality of generally U-shaped supporting stands arranged in spaced relationship lengthwise of the trough. Further, the conveyor, which is carried by the side walls, includes a plurality of plural prong pusher elements arranged intermediate the side walls for vertical swinging movement about an axis extending transversely of the side walls; an arrangement for imparting reciprocating movements to the pusher elements; and stop devices for maintaining the pusher elements in a vertically disposed position upon linear movement thereof in an ensilage feed direction, while permitting the pusher elements to swing to a position other than vertical upon linear movement in an opposite direction.

In a modified form of the present invention, a pair of side wall guides are hingedly secured to the supporting surface defining member for movement between discharge slot opening and closing portions. When the discharge slots are closed, grain, such as corn, may be mixed with ensilage and subsequently distributed through the length of the feed trough without separation. The evenly distributed grain and ensilage may be subsequently discharged into the trough by merely lowering the side wall guides to their normal positions, whereat they serve to guide the ensilage and grain toward opposite sides of the trough for easy access by the livestock.

An alternative form of the present invention has particular utility in situations, wherein the feeding area is remote from a silo, such as to require wagon transport of the ensilage, and/or where feeding is to be supplemented by wagon transported, freshly cut fodder. This form of the invention features an upstream conveyor unit, which includes a horizontal section, conveniently positioned to receive ensilage and/or fodder dumped from a wagon and an inclined section, which serves to raise the ensilage for discharge into the upstream end of the system previously described.

DRAWINGS

The nature and mode of operation of the present invention will now be more fully described in the following detailed description taken with the accompanying drawings wherein:

FIG. 1 is a perspective view of the system of the present invention;

FIG. 2 is a sectional view taken generally along line 2—2 of FIG. 1;

FIG. 3 is a sectional view taken generally along line 3—3 in FIG. 2;

FIG. 4 is a fragmentary exploded view illustrating the system drive;

FIG. 5 is a view similar to FIG. 2, but illustrating an alternative form of the present invention;

FIG. 6 is a perspective view illustrating another form of the present invention; and FIG. 7 is a sectional view taken generally along line 7—7 in FIG. 6.

DETAILED DESCRIPTION

Reference is now made more particularly to FIG. 1, wherein the system of the present invention is generally designated as 10 and shown as being positioned to extend horizontally throughout a livestock feeding area, such as for instance, an elongated generally U-shaped feeding trough 12 having a bottom wall 14 and facing side walls 16 and 18. As will hereinafter become apparent, ensilage or other relatively cohesive livestock food material may be fed by a suitable conveyor chute 20 from a silo, not shown, onto one end of system 10 for subsequent distribution thereby lengthwise of trough 12. While the present system may be employed for distributing all types of ensilage, of which I am aware, it will be understood that it has particular utility in distributing heretofore difficult to handle freshly cut fodders or ensilages formed from "grass" fodder, the latter becoming economically important in the feeding of dairy cattle.

Again referring to FIG. 1, system 10 is shown as generally including a pair of vertically disposed side walls 22 and 24, which are suitably joined in a spaced parallel relationship, as by a plurality of inverted U-shaped angle-iron brackets 26; a support guide device 28 having an upwardly facing ensilage supporting surface defining member 30 and a pair of downwardly and outwardly extending side guide wall members 32 and 34; a plurality of U-shaped support stands 36, which serve to positionally support brackets 26 and guide device 28 relative to each other and within trough 12; and an ensilage conveyor assembly 38.

As best shown in FIG. 2, the legs of each of brackets 26 are preferably provided with sleeves 40 and 42, which are adapted to freely receive the upwardly extending legs 44 and 46 provided on each of support stands 36; sleeves 40 and 42 bearing on elevation position pins 48, which are in turn removably received within one of a plurality of vertically spaced stand leg apertures 52. For normal feeding operations, pins 48 are positioned such that the lower edges of side walls 22 and 24 are arranged substantially coplanar with the upwardly facing supporting surface of member 30; and guide device 28 is locked in position, as by means of stand carried angle iron brackets 56, to maintain member 30 substantially equi-distant from side walls 22 and 24. When thus positioned, member 30 cooperates with the side walls to define a pair of downwardly opening equal sized slot discharge openings 60 and 62, which extend horizontally substantially throughout the length of trough 12. When the amounts of ensilage to be fed to opposite sides of trough 12 are desired to be unequal, as determined by the appetites by different ages or types of livestock to be fed, member 30 would be moved closer to one or the other of side walls 22 and 24 in order to inversely vary the widths of slot openings 60 and 62. Also, as will be apparent, one or the other of slot openings 60 and 62 may be completely closed and one or both of side walls 22 and 24 may be inclined relative to the vertical.

Conveyor assembly 38 is shown in FIGS. 1 through 4 as including a plurality of ensilage pusher elements 70 and an arrangement for imparting reciprocating movements to the pusher elements in a direction lengthwise of trough 12. The latter arrangement includes a pair of guide rails 72 and 74, which are fixed to brackets 26 one adjacent the upper edges of each of side walls 22 and 24; a pair of beams 76 and 78, which are slideably received within guide rails 72 and 74, respectively; a fluid motor assembly 80; and couplings 82 and 84 for connecting fluid motor assembly 80 to beams 76 and 78.

More particularly, each of pusher elements 70 includes a plurality of tongs 86, which are suitably affixed as by welding to a generally L-shaped support bracket 88, the latter being formed adjacent its upper end to receive a pivot or support shaft 90. As best shown in FIGS. 2 and 4, the respective ends of shaft 90 are journaled in L-shaped brackets 92 and 94, which are suitably joined as by bolts 96 and 98 to L-shaped brackets 100 and 102, the latter being secured to beams 76 and 78, respectively, as by welding.

Each of pusher elements 70 is also provided with one or more stops 104. Stops 104 are fixed, as by welding, to either of brackets 92 and 94 for the purpose of maintaining prongs 86 in a vertically disposed position upon linear movement of the pusher elements in a first or feed direction, designated by arrow 106 in FIGS. 1 and 3. In this position the free lower ends of prongs 86 are disposed closely adjacent supporting surface member 30. As will be apparent from viewing FIG. 3, stops 104 permit the prongs to swing about the axis of shaft 90 to a position other than vertical in order to permit the prongs to "clear" a previously transported charge of ensilage 108 upon linear movement of the pusher elements in a direction opposite to their feed direction.

Motor assembly 80 is best shown in FIGS. 3 and 4 as including a double acting hydraulic cylinder 110 having piston rods 112 and 114 extending from opposite ends thereof; a reversible flow control valve 116 for directing hydraulic fluid to or exhausting it from opposite ends of the cylinder; a hydraulic fluid reservoir 118; and a constant speed hydraulic pump 120. Associated with the operator 122 of valve 116 is a conventional, over center spring type actuator 124, which is adapted to be tripped in opposite directions for the purpose of reversing valve 116 by means of adjustable actuator trips 126 and 128. The free ends of piston rods 112 and 114 are pin joined to couplings 82 and 84, respectively, which are in turn suitably fixed to beams 76 and 78, as by means of bolts 96 and 98, respectively.

Trips 126 and 128 are suitably carried for movement with a pair of adjacent pusher elements arranged one on each side of actuator 124 in the direction of pusher element movement. In a normal installation, cylinder 110 would have upwards of about a 6 foot throw, such that the pusher elements would be reciprocated through a total of about 12 feet during each cycle of operation.

Referring to FIG. 2, it will be understood that a stationary bottom wall or floor 130 is provided between side walls 22 and 24 adjacent the point at which ensilage is dumped into the system from chute 20, thereby to define an upstream ensilage charge forming area.

In operation of unit 10, as thus far described, ensilage is continuously dumped onto bottom wall 130, as pusher elements 70 are reciprocated by operation of motor assembly 80. During each reciprocation, the first or upstream pushing element 70a initially moves along bottom wall 130 in the direction of arrow 106 beneath chute 20 in order to form and forward a of ensilage 108, stop 104 maintaining pushing element 70a in generally vertical disposition during this portion of travel. During return movement of pushing element 70a, a pile of ensilage 108a, which has been subsequently deposited on bottom wall 130, forces the prongs of pushing element 70a to pivot upwardly in a clockwise direction, as viewed in FIG. 3, until such time as pusher element 70a has returned to its initial position. During subsequent reciprocations of the pushing elements, such elements tend to successively forward or transfer the first formed charge along member 30 until it reaches the downstream end of the system, whereat a suitable deflector 140 fixed to member 30 serves to move the charge to either the right or the left for discharge through one or the other of slot openings 60 and 62. By the provision of deflector 140, there is no need to provide an end wall extending between side walls 22 and 24, and thus the possibility of charges of ensilage becoming jammed thereagainst is alleviated.

It is possible for the first formed charge to be accurately balanced on member 30 for transfer throughout the entire length of the system. However, as a practical matter, the first formed charge will normally fall off member 30 through one or the other of slot openings 60 and 62 at a point closely adjacent the end of bottom wall 130. Subsequent charges are discharged through the slot openings in a random manner with the tendency for the slot openings to become progressivly filled in a direction downstream of bottom wall 130. Due to the primary support afforded by member 30, subsequently forwarded charges when unbalanced tend to merely "slide" over the previously discharged charges blocking the outlet slots without producing any blockage of the feed. The period of operation will of course be determined by the amount of ensilage to be consumed during any given feeding period.

Reference is now made particularly to FIG. 5, which shows a modified form of the present invention, wherein side wall members 32 and 34 are pivotally supported adjacent their upper ends to member 30, such that they may be pivoted between discharge slot closing and opening positions, shown in full and phantom line, respectively. As will be apparent, the side wall members may be manually manipulated and releasably locked in closing position by any suitable latching arrangement, such as hook and eye catches 140. Alternatively, a suitable powered linkage, not shown, may be employed to drive the side wall members between their respective positions. This relatively simple arrangement is a particularly important feature of the present invention in that it permits grains, such as corn, to be mixed with the ensilage or freshly cut fodder and carried or swept along throughout the length of the system without separating from its associated charge. When employing this arrangement, operation would normally be terminated when the system is completely filled with charges 108 and the side wall members subsequently swung into their normal positions to permit the accumulated charges to be substantially simultaneously discharged through slot openings 60 and 62. The quantity of ensilage discharged in this manner may be supplemented by continued operation of the system in the normal manner.

Where the feeding area is remote from a silo, such as to require transport of the ensilage, and/or where feeding is to be supplemented at various periods of the year by freshly cut fodder, the arrangement primarily illustrated in FIG. 6 is of particular utility. This form of the present invention features an upstream charge forming section 150 having a horizontal portion 152, which is conveniently positioned to receive material dumped or otherwise discharged from a wagon and an inclined portion 154, which serves to connect horizontal portion 152 with the upstream end of the system previously described. Since no distribution is to occur in upstream section 150, each of portions 152 and 154 have their bottoms closed as by bottom walls 156 and 158, which are continuous with bottom wall 130. It will be understood that the construction of section 150 is similar to that described in connection with FIGS. 1 through 4, except that there is provided a pivotal beam assembly 160, which serves to support intermediate pusher element 70b such that its prongs 86a are properly positioned for movement successively above bottom walls 156, 158 and 130.

Assembly 160 comprises upstream and downstream beams 162 and 164, and 162a and 164a, which are pivotally joined together by pin shafts 166 and 168. Adjacent ends of beams 162 and 162a, and 164 and 164a are supported by roller elements 170, 172, which elements are arranged to travel within inclined guide rails 72' and 74'. Opposite ends of beams 162a and 164a are supported for movement with beams 76 and 78, as by pivot pin shafts 168 carried by pusher element 70a, in the manner best shown in FIG. 7. Opposite ends of beams 162 and 164 are supported by beams 76' and 78' as by pivot pin shafts 170 carried by one of drawn pusher elements 70c. Thus, it will be apparent that in operation, reciprocating movements of beams 76 and 78 are transmitted through assembly 160 to beams 76' and 78', such that charges of ensilage are formed within horizontal portion 152 by one of pusher elements 70c; the charges being subsequently presented to pusher element 70b for transfer upwardly onto bottom wall 130 into association with pusher element 70a.

I claim:

1. A system for feeding and distributing ensilage or other relatively cohesive livestock food material in a substantially uniform manner along a livestock feeding area, said system comprising in combination:

means defining a pair of vertically disposed side walls arranged to extend horizontally and in a spaced relationship throughout said feeding area;

means defining an elongated, upwardly facing ensilage supporting surface arranged intermediate said side walls, said supporting surface cooperating with at least one of said side walls to define a downwardly opening ensilage discharge slot extending substantially throughout said feeding area; and a conveyor for feeding ensilage supported on said supporting surface for discharge through said discharge slot, said conveyor including a plurality of ensilage pusher elements and means for mounting said pusher elements intermediate said side walls for horizontal reciprocating movement in a direction lengthwise of said supporting surface.

2. A system according to claim 1, wherein said supporting surface cooperates with said side walls to define a pair of parallel discharge slots.

3. A system according to claim 2, wherein said means for defining said supporting surface includes side guide wall members, said wall members sloping downwardly and outwardly relative to said supporting surface for guiding ensilage discharge through said discharge slots downwardly and transversely outwardly relative to said side walls.

4. A system according to claim 3, wherein said side guide wall members are supported adjacent said supporting surface for vertical swinging movement between discharge slot closing and opening positions, and means are provided to releasably retain said wall members in said closing position.

5. A system according to claim 1, wherein said side walls are supported above said feeding area by generally U-shaped stand devices spaced apart lengthwise of said side walls, and said stand devices positionally support said supporting surface defining means intermediate said side walls.

6. A system according to claim 5, wherein said stand devices include means to adjust said side walls vertically relative to said supporting surface.

7. A system according to claim 1, wherein said pusher elements each include a plurality of prongs carried for vertical swinging movement about an axis extending transversely of said side walls and stop means, said stop means operating during reciprocating movement of said pusher elements to maintain said prongs in a vertically disposed position upon linear movement thereof in a first feed direction and permitting said prongs to swing to a position other than vertical upon linear movement thereof in an opposite direction.

8. A system according to claim 1, wherein said conveyor mounting means includes a pair of guide rails fixed one adjacent upper edges of each of said side walls, a pair of elongated beams slideably supported one by each of said guide rails, motor means, and means coupling said motor means to said beams for imparting reciprocating movement to the latter; and each of said pusher elements includes a plurality of prongs, means carried by said beams for mounting said prongs for vertical swinging movement about an axis extending transversely of said side walls, and stop means, said stop means operating during reciprocating movement of said beams to maintain said prongs in a vertically disposed position upon linear movement thereof in a first feed direction and permitting said prongs to swing to a position other than vertical upon linear movement thereof in an opposite direction, said prongs having free lower ends thereof disposed immediately adjacent said supporting surface when said prongs are in said vertically disposed position thereof.

9. A system according to claim 1, wherein said side walls and said conveyor extend beyond said feeding area to define an upstream area for receiving ensilage to be fed by said conveyor for distribution as aforesaid and said supporting surface is broadened throughout said upstream area to extend transversely between said side walls.

10. A system according to claim 9, wherein said upstream area includes means for transferring ensilage between vertically spaced levels.

* * * * *